United States Patent
Bantupalli et al.

(10) Patent No.: US 10,437,853 B2
(45) Date of Patent: Oct. 8, 2019

(54) TRACKING DATA REPLICATION AND DISCREPANCIES IN INCREMENTAL DATA AUDITS

(71) Applicant: LinkedIn Corporation, Mountain View, CA (US)

(72) Inventors: Janardh Bantupalli, Union City, CA (US); Sai Sundar Selvaganesan, Sunnyvale, CA (US); Basavaiah Thambara, Bangalore (IN); Srivathsan Vijaya Raghavan, Milpitas, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 614 days.

(21) Appl. No.: 15/071,823

(22) Filed: Mar. 16, 2016

(65) Prior Publication Data

US 2017/0270175 A1   Sep. 21, 2017

(51) Int. Cl.
   *G06F 16/30* (2019.01)
   *G06F 16/27* (2019.01)
   *G06F 16/13* (2019.01)
   *G06F 16/23* (2019.01)

(52) U.S. Cl.
   CPC .......... *G06F 16/273* (2019.01); *G06F 16/137* (2019.01); *G06F 16/2365* (2019.01)

(58) Field of Classification Search
   None
   See application file for complete search history.

(56) References Cited

U.S. PATENT DOCUMENTS

| | | | |
|---|---|---|---|
| 2003/0225742 A1* | 12/2003 | Tenner | G06F 17/30557 |
| 2007/0090181 A1* | 4/2007 | Varadarajan | G06Q 20/04 235/380 |
| 2015/0135255 A1* | 5/2015 | Theimer | H04L 63/20 726/1 |
| 2015/0222604 A1* | 8/2015 | Ylonen | H04L 63/062 713/171 |
| 2017/0270153 A1 | 9/2017 | Bantupalli et al. | |

OTHER PUBLICATIONS

"Non Final Office Action Issued in U.S. Appl. No. 15/071,815", dated May 11, 2018, 12 Pages.

* cited by examiner

*Primary Examiner* — Irete F Ehichioya
*Assistant Examiner* — Johnese T Johnson
(74) *Attorney, Agent, or Firm* — Park, Vaughan, Fleming & Dowler LLP; Chia-Hsin Suen

(57) ABSTRACT

The disclosed embodiments provide a system for processing data. During operation, the system obtains a first transaction timestamp from a record that is replicated across a set of data sources. Next, the system includes at least a portion of the first transaction timestamp in a first key of a first mapping of the record to a first set of values for the record from the set of data sources. The system then audits the record by comparing the first set of values in the first mapping. Finally, the system outputs a result of the audited record based on the compared first set of values.

20 Claims, 7 Drawing Sheets

TRACKING DATA REPLICATION AND DISCREPANCIES IN INCREMENTAL DATA AUDITS

RELATED APPLICATION

The subject matter of this application is related to the subject matter in a co-pending non-provisional application by the same inventors as the instant application and filed on the same day as the instant application, entitled "Real-Time Incremental Data Audits," having Ser. No. 15/071,815, and filing date 16 Mar. 2016.

BACKGROUND

Field

The disclosed embodiments relate to data auditing. More specifically, the disclosed embodiments relate to techniques for tracking data replication and discrepancies in incremental data audits.

Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

On the other hand, significant increases in the size of data sets have resulted in difficulties associated with collecting, storing, managing, transferring, sharing, analyzing, and/or visualizing the data in a timely manner. For example, data used within an organization may be replicated across multiple data centers in different locations. To detect failures or issues with the replication, replicated copies of the data may periodically be retrieved from the data centers and compared. However, conventional data audit mechanisms are unable to scale with large data sets because bulk queries for retrieving the data sets may consume significant resources on databases in which the data sets are stored. Moreover, subsequent comparison of the retrieved data may only identify discrepancies between entire data sets, and fail to indicate where and when the discrepancies occur.

Consequently, management and replication of large data sets may be facilitated by improving the efficiency and granularity of data audit mechanisms.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
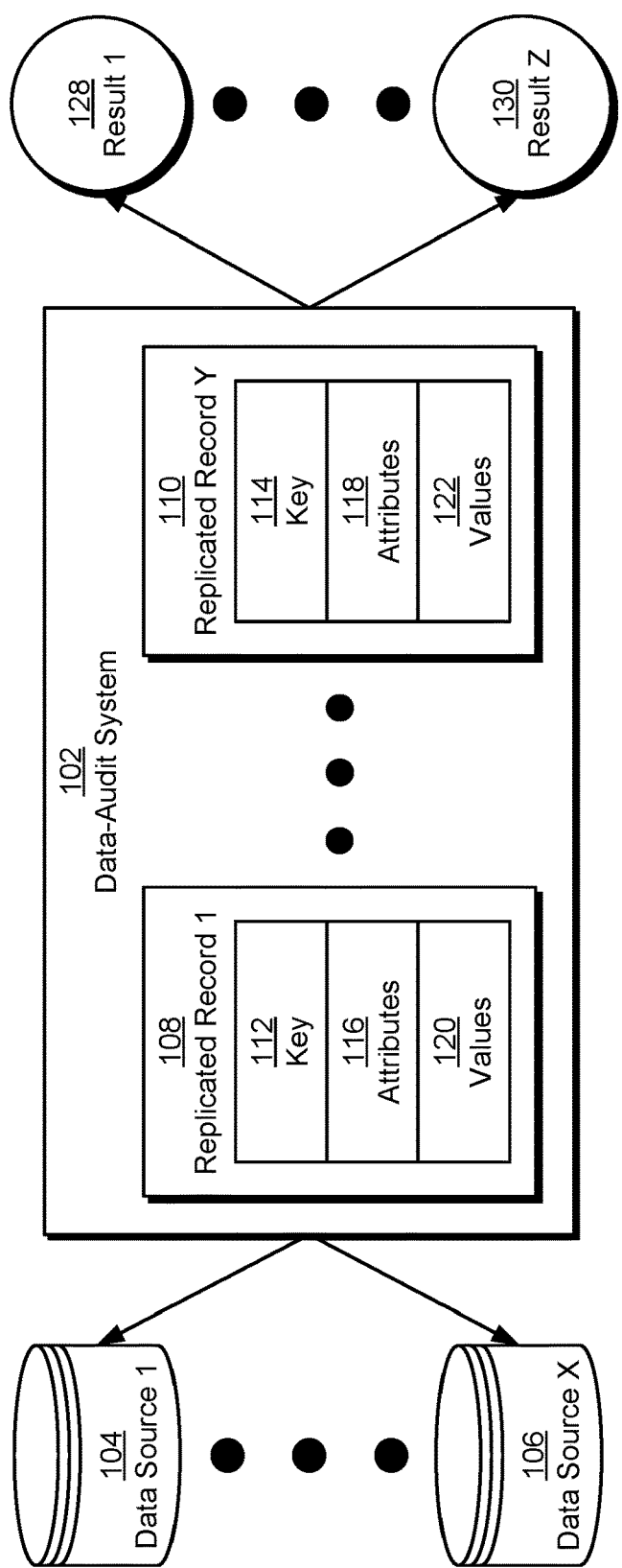
FIG. 1 shows a schematic of a system in accordance with the disclosed embodiments.

The disclosed embodiments provide a method and system for processing data. As shown in FIG. 1, the system may be a data-audit system 102 that collects input data from a set of data sources (e.g., data source 1 104, data source x 106), compares a set of replicated records (e.g., replicated record 1 108, replicated record y 110) from the data sources, and generates a set of results (e.g., result 1 128, result z 130) based on the comparison. In other words, data-audit system 102 may perform audits of data in the data sources to verify that the data is replicated correctly across the data sources.

More specifically, a data set may be replicated as a number of records (e.g., replicated record 1 108, replicated record y 110) across a number of data centers, colocation centers, databases, and/or other data sources. For example, the records may be replicated across data sources in multiple geographic locations to improve the availability of the data, mitigate data center failures, and/or increase performance by moving operations closer to end users. The data may be stored in a set of relational database tables, text files, binary files, and/or in other formats. Data-audit system 102 may obtain the replicated records from the data sources as a set of incremental, recent updates to the replicated records from database log files and/or logging mechanisms associated with the data sources.

Next, data-audit system 102 may audit the replicated records to detect failures or issues with data replication among the data sources. To perform the comparison, data-audit system 102 may generate a key 112-114 for each replicated record using attributes 116-118 associated with the replicated record, such as a schema, a database table, a primary key, and/or a portion of a timestamp.

Data-audit system 102 may also map the key to a set of values 120-122 representing data elements in the replicated record. For example, data-audit system 102 may store a mapping of the key to a list of hash values, with each hash value generated from a copy of the replicated record from a different data source. Data-audit system 102 may then audit the replicated record by comparing the values in the mapping to identify mismatches within the values. Finally, data-audit system 102 may output a result (e.g., result 1 128, result z 130) of the audited input data based on the comparison. Thus, data-audit system 102 may include functionality to perform real-time incremental auditing of data from the data sources, as described in further detail below.

Figure 2:
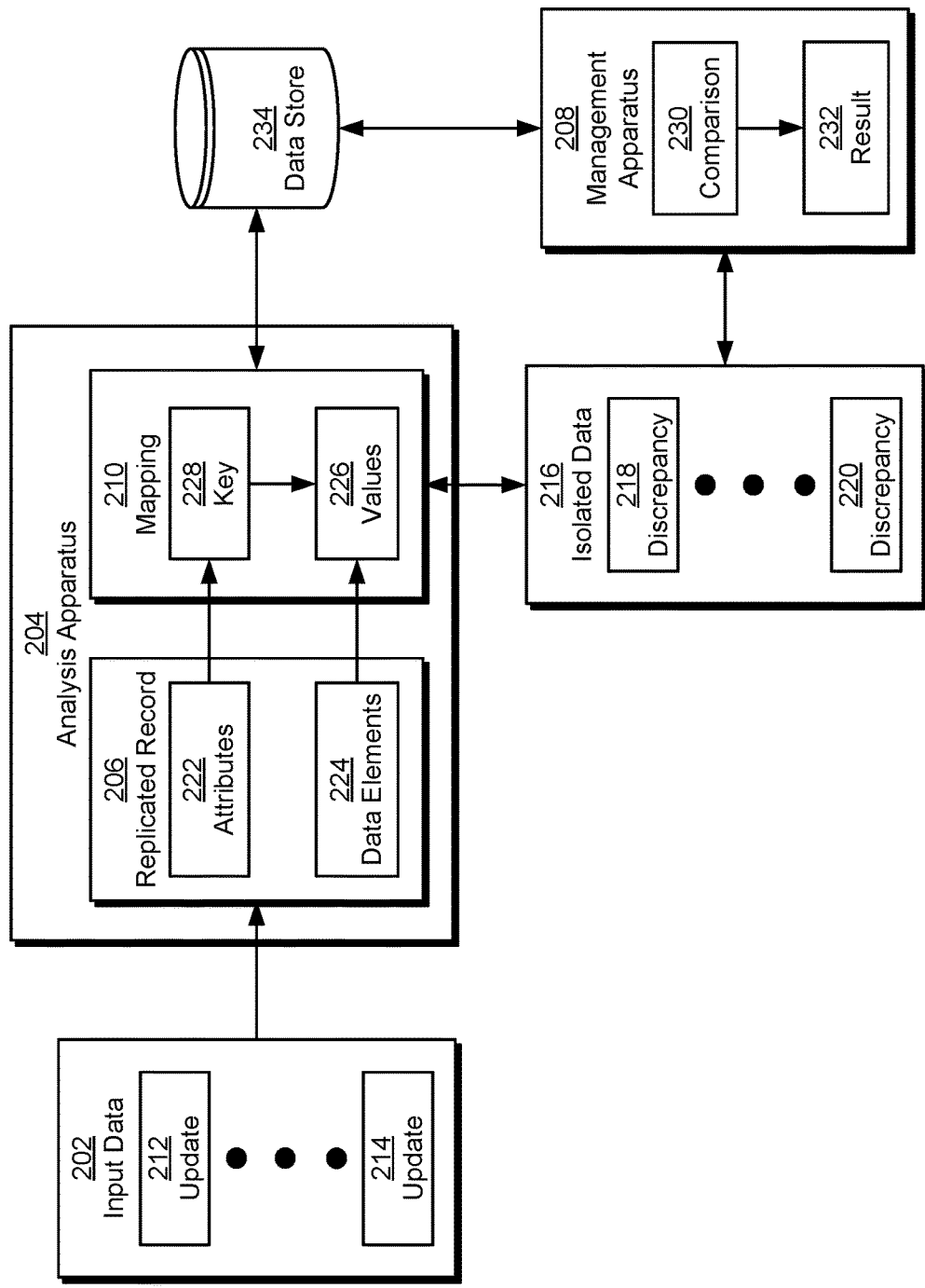
FIG. 2 shows a system for processing data in accordance with the disclosed embodiments.

FIG. 2 shows a system for processing data in accordance with the disclosed embodiments. More specifically, FIG. 2 shows a system for auditing a set of input data 202, such as data-audit system 102 of FIG. 1. As shown in FIG. 2, the system includes an analysis apparatus 204 and a management apparatus 208. Each of these components is described in further detail below.

Analysis apparatus 204 may obtain input data 202 from multiple data sources. As mentioned above, the data set may include a set of records that is replicated across the data sources. Each data source may store some or all of the records in the data set, and changes to one copy of a record at a data source may be propagated to other copies of the record at other data sources.

The most recent values of the records may additionally be obtained from transaction logs and/or logging mechanisms that capture incremental updates 212-214 to the records at the data sources. For example, each update to input data 202 may be captured in a log file entry that describes a corresponding change to a record in the data set. In addition, updates may be written to the log file in the same order in which the updates were generated at the corresponding data source. As a result, analysis apparatus 204 may use the ordered entries in the log file to construct the most recent version of the data set.

To obtain the most recent version of the data set without overloading the databases with audit-related queries, analysis apparatus 204 may retrieve the updates from the log files and/or logging mechanisms. Analysis apparatus 204 may further retrieve the updates at pre-defined intervals (e.g., every few minutes) or as the updates are added to the log files and/or by the logging mechanisms. Because database resources are not consumed during extraction of input data 202, auditing of input data 202 may scale with the size of the data set.

In addition, analysis apparatus 204 may obtain input data 202 as a full set of updates 212-214 to the data set or as a sample of the updates. For example, analysis apparatus 204 may include all updates to the data set over a pre-specified period (e.g., an hour, a day, a week, etc.) in input data 202 to be analyzed in an incremental audit of the data set. Alternatively, analysis apparatus 204 may hash the updates into a set of buckets and extract a subset of the buckets (e.g., 1 out of 10) as input data 202.

Next, analysis apparatus 204 may obtain a set of attributes 222 and a set of data elements 224 for each replicated record 206 in input data 202. Attributes 222 may identify each unique record in input data 202. For example, attributes 222 may include a schema, database table, primary key, and/or partial timestamp shared by all copies of a database row that is replicated across a number of data sources. As a result, attributes 222 may be used to identify and track updates to the copies of replicated record 206 as the updates are propagated across the data sources.

Data elements 224 may include a number of distinct units of data in each copy of replicated record 206. For example, data elements 224 may include a number of database columns and/or fields in the row represented by replicated record 206.

Analysis apparatus 204 may use attributes 222 and data elements 224 to generate, in a data store 234, a mapping 210 of a key 228 to a number of values 226. First, analysis apparatus 204 may generate key 228 from attributes 222. For example, analysis apparatus 204 may produce key 228 as a tuple of attributes 222, a concatenation of attributes 222, and/or a hash value from attributes 222. Next, analysis apparatus 204 may produce one or more values from one or more data elements 224 in each copy of replicated record 206, and store the value with key 228 in mapping 210. For example, analysis apparatus 204 may calculate a hash value from a number of database columns in the copy and store the hash value in a position in mapping 210 that represents the data source in which the copy is stored. In other words, analysis apparatus 204 may generate the same key 228 from attributes shared by the copies and then use the key to store, in the same mapping 210, a set of values, with each value representing a copy of the record from a different data source. For example, analysis apparatus 204 may store the hash value generated from a given copy of the record in a column, array element, and/or other position in mapping 210 that represents the data source of the copy.

Alternatively, analysis apparatus 204 may store individual data elements from replicated record 206 with the key to enable subsequent analysis and/or comparison of the data elements in lieu of, or in combination with, record-level comparison of data in the copies. For example, analysis apparatus 204 may include one or more column names in the key so that values of different database columns in replicated record 206 are stored in separate mappings in data store 234. Such separation of data elements from the same unique record into different mappings in data store 234 may enable auditing of the record at a higher granularity than the storing of a single hash value representing all relevant data elements from the record in a single mapping.

Because subsequent updates to replicated record 206 map consistently to the same key 228, the updates may be used to calculate new values (e.g., hash values) that replace previous values representing copies of the record in mapping 210. Consequently, analysis apparatus 204 may use mapping 210 to perform deduplication of multiple versions of the same record, which may reduce the consumption of storage resources during auditing of input data 202 by a significant factor. To further limit the size of data store 234, analysis apparatus 204 and/or another component of the system may discard mappings with values that have not been updated over a pre-specified period (e.g., a day, a week, etc.).

In one or more embodiments, propagation of individual updates to replicated record 206 is tracked by including at least a portion of a transaction timestamp from the record in attributes 222 used to generate key 228. The transaction timestamp may represent the time at which the corresponding update was made to the record. For example, the transaction timestamp may indicate the time at which a database transaction was used to modify a field in the record at a given data source (e.g., database). The same transaction timestamp may then be propagated with the modified field and/or other portions of the record to other data sources and/or log files or logging mechanisms associated with the data sources. In other words, the transaction timestamp may track the time at which the update was originally made, independently of when the update is propagated to other data stores.

In turn, a change in the portion of the transaction timestamp included in key 228 may result in the generation of a new mapping in data store 234. More specifically, the transaction timestamp of replicated record 206 may change when a subsequent transaction that applies a new update to the record is performed. If the change in the transaction timestamp is reflected in key 228, the new update may be tracked in a separate mapping in data store. For example, the inclusion of the day and hour from the transaction timestamp in key 228 may cause updates to the record that occur within the same hour to be "bucketed" into the same mapping and updates to the record that occur within the next hour to be automatically "bucketed" into a different mapping. Timestamp-based tracking of data replication across data sources is described in further detail below with respect to FIG. 3.

By separating updates to replicated record 206 into different mappings representing time-based "buckets," analysis apparatus 204 may ensure the consistency of the values in a given mapping after the "bucketing" period has passed and the most recent update initiated within the period has been propagated across the data sources. Continuing with the above example, a first update with a transaction timestamp containing a time of "10:55 am" may be "bucketed" into a first mapping representing updates to the record in the range of [10 am, 11 am). A subsequent update with a transaction timestamp containing a time of "11:15 am" from the same day may be "bucketed" into a second mapping representing updates to the record in the range of [11 am, 12 pm). When the second mapping has been updated with a full set of values, thus indicating that the subsequent update has been propagated across the data sources, the values in the first mapping may be assumed to be static, since propagation of the first update should have concluded before propagation of the second update.

The portion of the transaction timestamp included in key 228 may also be selected based on the rate at which data is expected to propagate across the data sources. For example, a service level agreement (SLA) may require that an update to data at one data source be propagated to the other data sources within 30 minutes. As a result, attributes 222 may include the day, hour, and half-hour portions of the transaction timestamp to reflect the expected rate of data replication in the data sources.

Continuing with the previous example, a record from a table named "invt.invitations" with a primary key of "100" may be mapped to a key of "invt_invitations:A:100", where ":^:" is a delimiter. All copies of the record may map to the same key in data store 234, and values stored with the key may be updated in data store 234 to reflect the latest changes to the data elements in the copies. Within the key, the table name and primary key may be separated by the delimiter to allow the key to be reverse-mapped to actual copies of the record in the data sources. When the day, hour, and half-hour portions of a transaction timestamp in the record are further included in the attributes, the key may have an exemplary value of "12-15-2015-10:30:^:invt_invitations: ^:100," and all copies of the record that are updated on Dec. 15, 2015 in the range of [10:30 am, 11 am) may be stored with the key to facilitate comparison of half-hourly changes to the record. Updates to the record that are made in other half-hour intervals may, in turn, be stored with other keys in data store 234. While such time-based separation of updates into different mappings may increase the storage requirements of the system, the size of data store 234 may be bounded by discarding mappings that are older than a threshold, as described above.

After mapping 210 is generated or updated using input data 202, management apparatus 208 may audit replicated record 206 by performing a comparison 230 of values 226 in mapping 210. For example, management apparatus 208 may retrieve values 226 to which key 228 is mapped in data store 234 and compare values 226 to identify mismatches in copies of replicated record 206. Because all values 226 associated with comparison 230 are stored in the same mapping 210, auditing of input data 202 may be performed without performing database joins or other computationally expensive operations.

Those skilled in the art will appreciate that a change to one copy of a replicated record may be propagated to other copies of the replicated record after a finite delay. To account for the delay, management apparatus 208 may generate comparison 230 for a given mapping (e.g., mapping 210) in data store 234 after a pre-specified period after a most recent update to the corresponding record has passed. For example, replication of data across the data sources may be associated with a delay of up to one hour, as specified by an SLA associated with the data sources. In addition, the time of an update may be tracked by the portion of the update's transaction timestamp in the key of the corresponding mapping. As a result, management apparatus 208 may compare values (e.g., values 226) in the mapping an hour after the time represented by the portion of the transaction timestamp in the key to verify that the update was successfully propagated across the data sources.

Management apparatus 208 may also output a result 232 of the audited data based on comparison 230. For example, management apparatus 208 may generate a notification of mismatches or discrepancies in copies of replicated records from input data 202. The notification may identify the replicated records affected by the mismatches, along with the data sources, timestamps, and/or data elements (e.g., data elements 224) associated with the mismatches.

To further facilitate access to data with audit discrepancies, management apparatus 208 may produce a set of isolated data 216 containing discrepancies 218-220 in the replicated records. For example, management apparatus 208 may store mappings containing the discrepancies (e.g., as represented by differences in the values of the mappings) in a separate data store (not shown) from data store 234. In another example, management apparatus 208 may index the mappings for efficient retrieval and analysis of the discrepancies. In a third example, management apparatus 208 may discard mappings that do not contain discrepancies from data store 234 after the values in the mappings are determined to be static or consistent, thereby leaving mappings with discrepancies and/or mappings for records that have not yet been audited. In a fourth example, management apparatus 208 may combine a plurality of the previously described techniques (e.g., indexing, separate data store, discarding data not associated with audit discrepancies) to produce isolated data 216.

After isolated data 216 is produced, management apparatus 208 may provide isolated data 216 and/or a location (e.g., path, database name, etc.) of the isolated data in result 232. In turn, information in the isolated data and/or result may allow an administrator to identify and remedy failures or issues with replicating data across the data sources without searching the entire data set in data store 234 for the discrepancies.

In one or more embodiments, analysis apparatus 204, management apparatus 208, and/or other components of the system include functionality to parallelize the auditing of replicated records from input data 202. For example, analysis apparatus 204 and management apparatus 208 may execute multiple threads and/or processes to parallelize the update and comparison 230 of mappings from different database tables, entities, data sources, and/or schemas. Consequently, the incremental data audits performed by the system of FIG. 2 may be faster, more scalable, at a higher granularity, and/or more timely than conventional data audit mechanisms that perform bulk querying and comparison of entire data sets from multiple data sources.

Those skilled in the art will appreciate that the system of FIG. 2 may be implemented in a variety of ways. First, analysis apparatus 204, management apparatus 208 and data store 234 may be provided by a single physical machine, multiple computer systems, one or more virtual machines, a grid, one or more databases, one or more filesystems, and/or a cloud computing system. Analysis apparatus 204 and management apparatus 208 may additionally be implemented together and/or separately by one or more hardware and/or software components and/or layers.

Second, auditing of input data 202 may be adjusted by varying the sets of attributes 222 and data elements 224 used to generate key 228 and values 226 in mapping 210. More specifically, a distinct record in input data 202 may be defined by attributes (e.g., attributes 222) used to generate a key (e.g., key 228) representing the record. Thus, the record may be deduplicated in data store 234 along different boundaries by including different sets of attributes in the key. For example, the record may be deduplicated along transaction and/or update boundaries by including some or all of a transaction timestamp in the record in the key, as previously mentioned. In another example, mappings in data store 234 may track changes to individual fields or columns in a given record by including the corresponding field or column names in keys of the mappings and calculating hash values to which the keys are mapped from the values of the fields or columns. As a result, the mappings may be used to identify discrepancies or mismatches among copies of the fields or columns instead of copies of the record as a whole.

Figure 3:
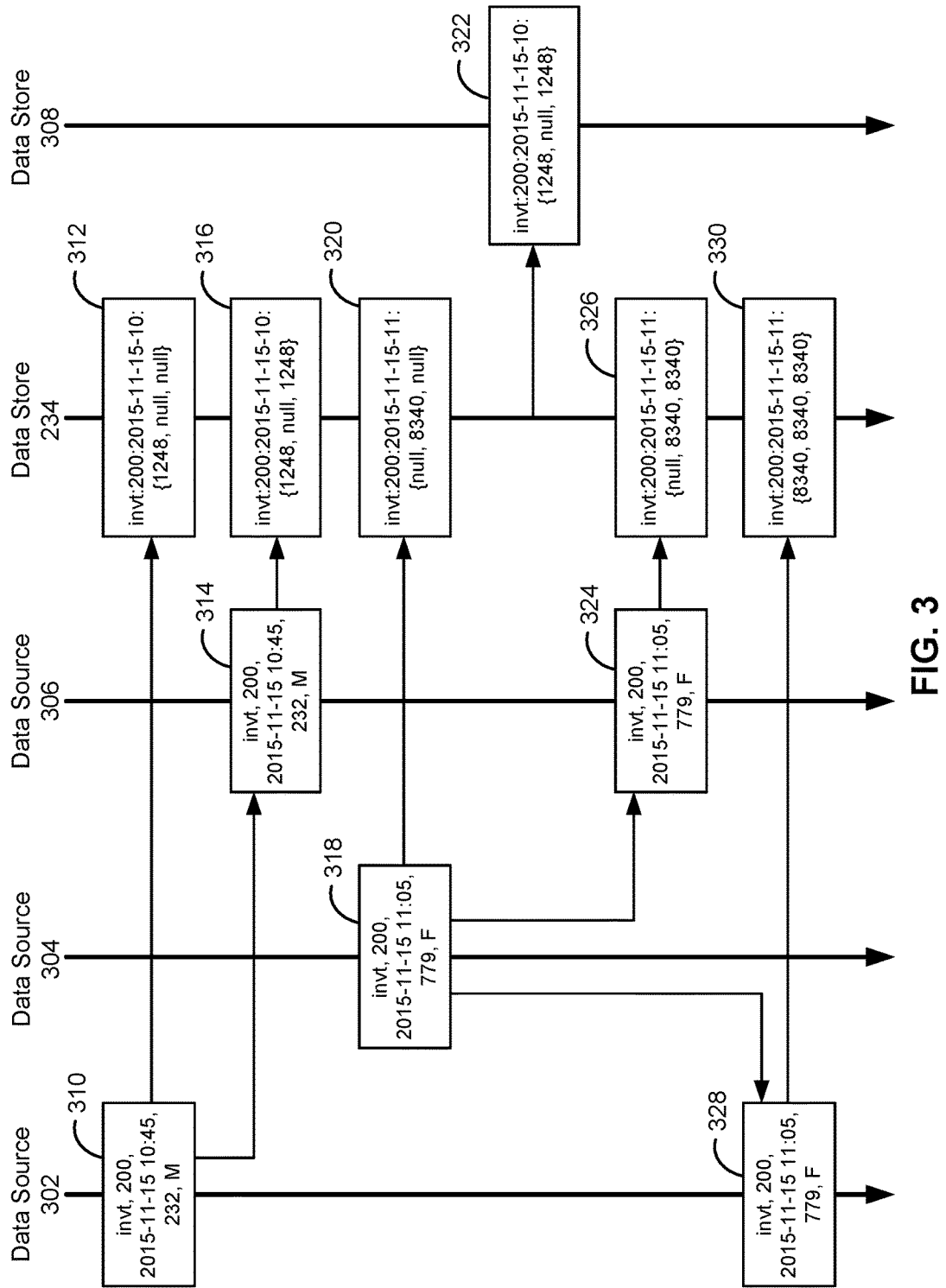
FIG. 3 shows an exemplary sequence of operations associated with performing an incremental data audit in accordance with the disclosed embodiments.

FIG. 3 shows an exemplary sequence of operations associated with performing an incremental data audit in accordance with the disclosed embodiments. As described above, the incremental data audit may be performed by storing a set of values associated with different copies of a replicated record or an update to the record from a set of data sources 302-306 in the same mapping in data store 234.

As shown in FIG. 3, an update 310 to the record from data source 302 may initially be used to produce a mapping 312 in data store 234. For example, a set of attributes with values of "invt" and "200" and a transaction timestamp of "2015-11-15 10:45" in update 310 may be used to produce a key of "invt:200:2015:11-15-10" in mapping 312. In other words, the key may include the first two attributes and the day and hour portions of the transaction timestamp. A set of data elements in the record with values of "232" and "M" may also be used to produce a hash value of "1248," which is then stored in a first position (e.g., array element, column, field, etc.) of mapping 312 that represents data source 312.

Because update 310 has not been propagated to other data sources 304-306 at the time at which mapping 312 is generated, the second and third positions of mapping 312 representing the other data sources may contain null values.

Next, an update 314 to the record from data source 306 is used to produce a corresponding update 316 to mapping 312. Because update 314 contains the same values as update 310, update 314 may represent a propagation of update 310 from data source 302 to data source 306. In turn, update 314 may be mapped to the same key in mapping 312 and used to produce the same hash value of "1248," which is stored in the third position of mapping 312 that represents data source 306.

A different update 318 to the record may then be received from data source 304. For example, update 318 may be made at data source 304 before update 310 has been propagated from data source 302 to data source 304. Update 318 may have the same attributes of "invt" and "200" as update 310, thus indicating that update 318 pertains to the same unique record as update 310. However, because update 318 represents a separate modification of the record from update 310, the transaction timestamp of update 318 may be set to a later time of "2015-11-15 11:05," and the data elements in update 318 may have values of "779" and "F" instead of "232" and "M," respectively. The attributes and later transaction timestamp may be used to produce a key to a mapping 320 for the record in data store 234 that is separate from mapping 312, and the data elements may be used to generate a hash value of "8340" that is stored in the second position of mapping 320, which represents data source 304. Because update 318 has not yet been propagated to the other data sources 302 and 306, the first and third positions of mapping 320, which represent the other data sources, may initially be set to null values.

As shown in FIG. 3, mapping 312 may lack an update to a value for data source 304. For example, the second position of mapping 312 may continue to have a null value because update 310 may fail to be replicated at data source 304. As a result, mapping 312 may be copied to a mapping 322 in a separate data store 308 during an audit that identifies a discrepancy in the values of mapping 312. For example, the audit may be performed after a pre-specified period has passed after the time represented by the transaction timestamp in update 310 to allow update 310 to propagate to the remaining data sources 304-306 within the period. After the period has passed, data in mapping 312 may be assumed static or consistent, and mapping 312 may be audited by comparing the values stored in the three positions of mapping 312. Since update 310 is never applied or received at data source 304, the audit may identify a discrepancy between the hash value produced from update 310 (e.g., 1248) and the value stored in the position representing data source 304 in mapping 312 (e.g., null).

By copying mapping 312 to mapping 322 after the discrepancy is discovered, data containing the discrepancy may be isolated from other data that does not contain audit discrepancies. In turn, the isolation of the discrepancy and other "data of interest" in the data sources may enable subsequent analysis of the data without requiring a linear search of data store 234 for the data.

Finally, two updates 324 and 328 from data sources 306 and 302, respectively, may be used to produce corresponding updates 326 and 330 to mapping 320. Updates 324 and 328 may have the same values as update 318, indicating that update 318 has been propagated to data sources 302 and 306. In turn, updates 326 and 330 may be used to update the corresponding positions in mapping 320 with the same hash value as the hash value produced from update 318. Because all three positions in mapping 320 contain the same value (e.g., 8340) after updates 326 and 330 are made, a subsequent audit of mapping 320 may confirm that update 318 was successfully propagated across data sources 302-306.

Figure 4:
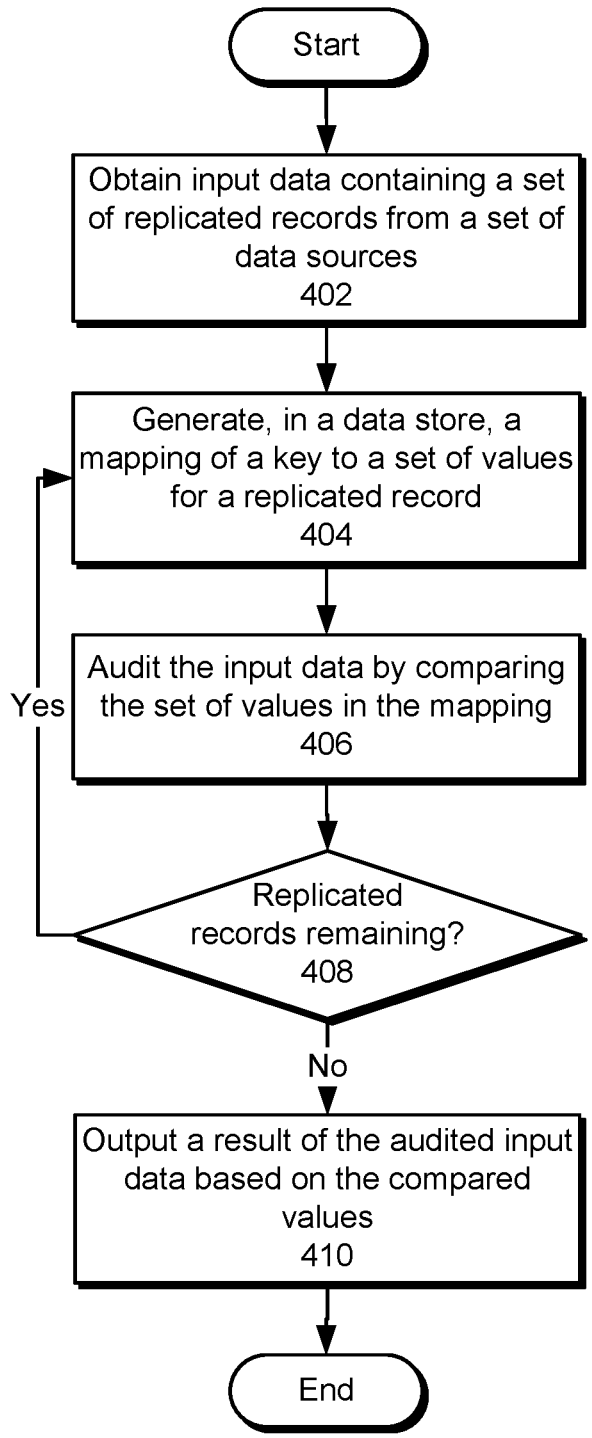
FIG. 4 shows a flowchart illustrating the processing of data in accordance with the disclosed embodiments.

FIG. 4 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, input data containing a set of replicated records from a set of data sources is obtained (operation 402). For example, the input data may be obtained from log files and/or logging mechanisms as a set of recent updates to the replicated records at the data sources. As a result, the input data may track incremental changes to the records as the changes are made at individual data sources.

Next, a mapping of a key to a set of values for a replicated record is generated in a data store (operation 404), and the input data is audited by comparing the set of values in the mapping (operation 406), as described in further detail below with respect to FIG. 5. Operations 404-406 may be repeated for all remaining replicated records (operation 408) in the input data. For example, mappings may periodically and/or continuously be generated, updated, and compared to audit the input data on a real-time or near-real-time, incremental basis. Operations 404-406 may also be parallelized across database tables, schemas, and/or data stores to expedite the auditing process. Finally, a result of the audited input data is outputted based on the compared values (operation 410).

Figure 5:
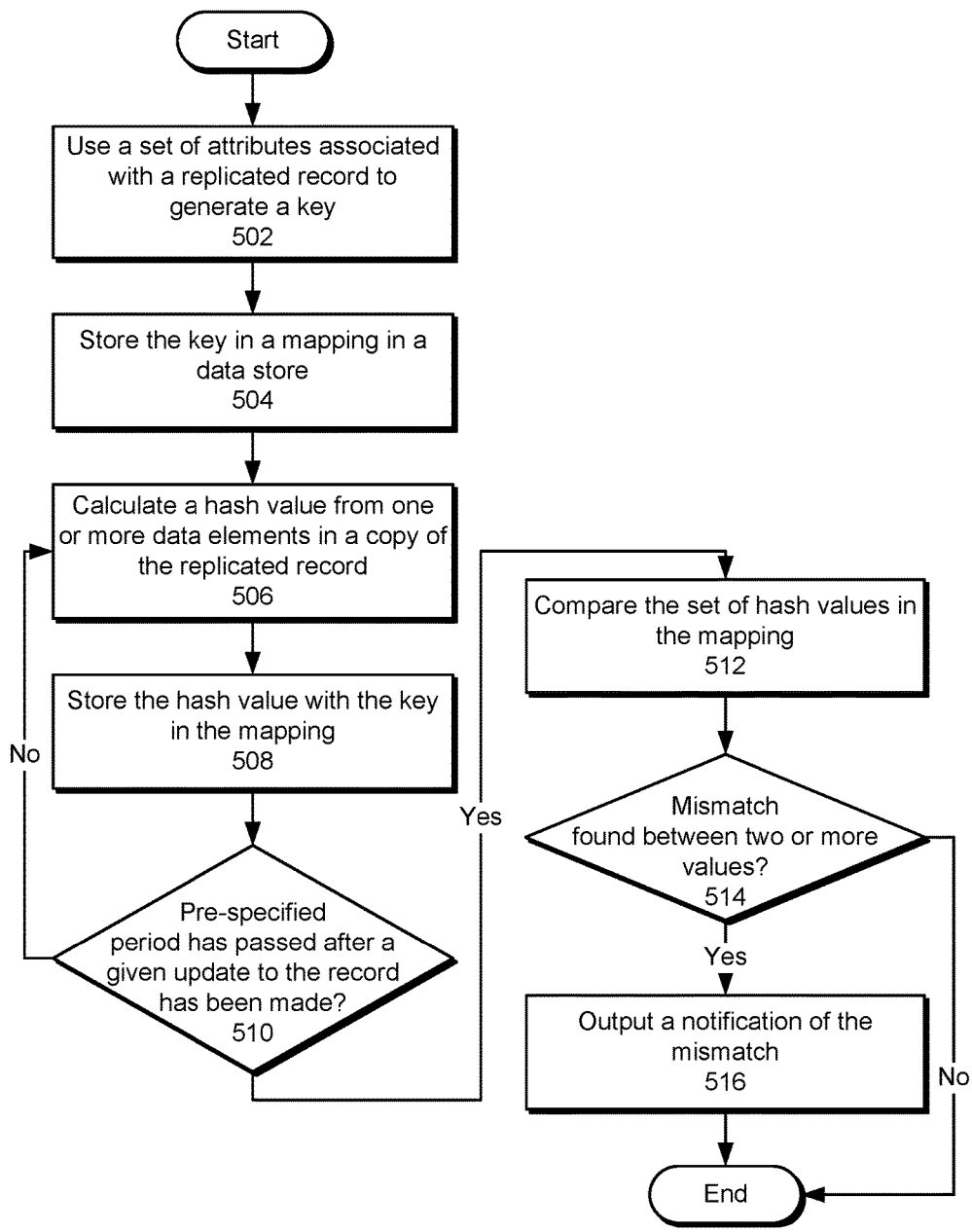
FIG. 5 shows a flowchart illustrating the process of auditing a replicated record in accordance with the disclosed embodiments.

FIG. 5 shows a flowchart illustrating the process of auditing a replicated record in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, a set of attributes associated with the replicated record is used to generate a key (operation 502) for the replicated record. For example, a schema, database table, primary key, and/or portion of a timestamp associated with the replicated record may be concatenated, hashed, or otherwise combined to produce the key. Next, the key is stored in a mapping in a data store (operation 504), such as an in-memory key-value store.

A hash value is also calculated from one or more data elements in a copy of the replicated record (operation 506) and stored with the key in the mapping (operation 508). For example, the hash value may be calculated from mutable data elements that are replicated across copies of the replicated record. The hash value may then be stored in a position in the mapping that represents the data source in which the copy is stored, such as an array element with an index that maps to an identifier for the data source. Because the copy consistently maps to the same position in the mapping, the calculated hash value may replace a previous hash value for the copy. Consequently, the mapping may be used to perform deduplication of multiple versions of the same unique record.

To allow incremental updates to propagate across copies of the replicated record, comparison of hash values in the mapping may be delayed until a pre-specified period after a given update to the record has passed (operation 510). For example, a new update to the record may be identified as a change in a copy of the record after the most recent audit of the record. A subsequent audit of the record may be delayed for an hour after the update to ensure that the update has been received and applied at all data sources containing the record. During the pre-specified period, hash values may continue to be calculated from data elements in copies of the replicated record (operation 506) and stored in the mapping (operation 508) to maintain an up-to-date representation of the replicated record in the mapping.

After the pre-specified period has passed, the set of hash values in the mapping is compared (operation 512) to detect a mismatch between two or more values (operation 514) in the mapping. For example, the key may be used to retrieve the hash values from the mapping, and a simple comparison of the hash values may be performed to identify any mismatches in the hash values. If a mismatch is found, a notification of the mismatch is outputted (operation 516). The notification may identify the record associated with the mismatches, the mismatched values, timestamps and data sources associated with the mismatches, and/or other information that may be used to mitigate or correct the mismatches. The mapping may optionally be stored in a separate data store and/or indexed to facilitate subsequent analysis and resolution of the mismatch.

Figure 6:
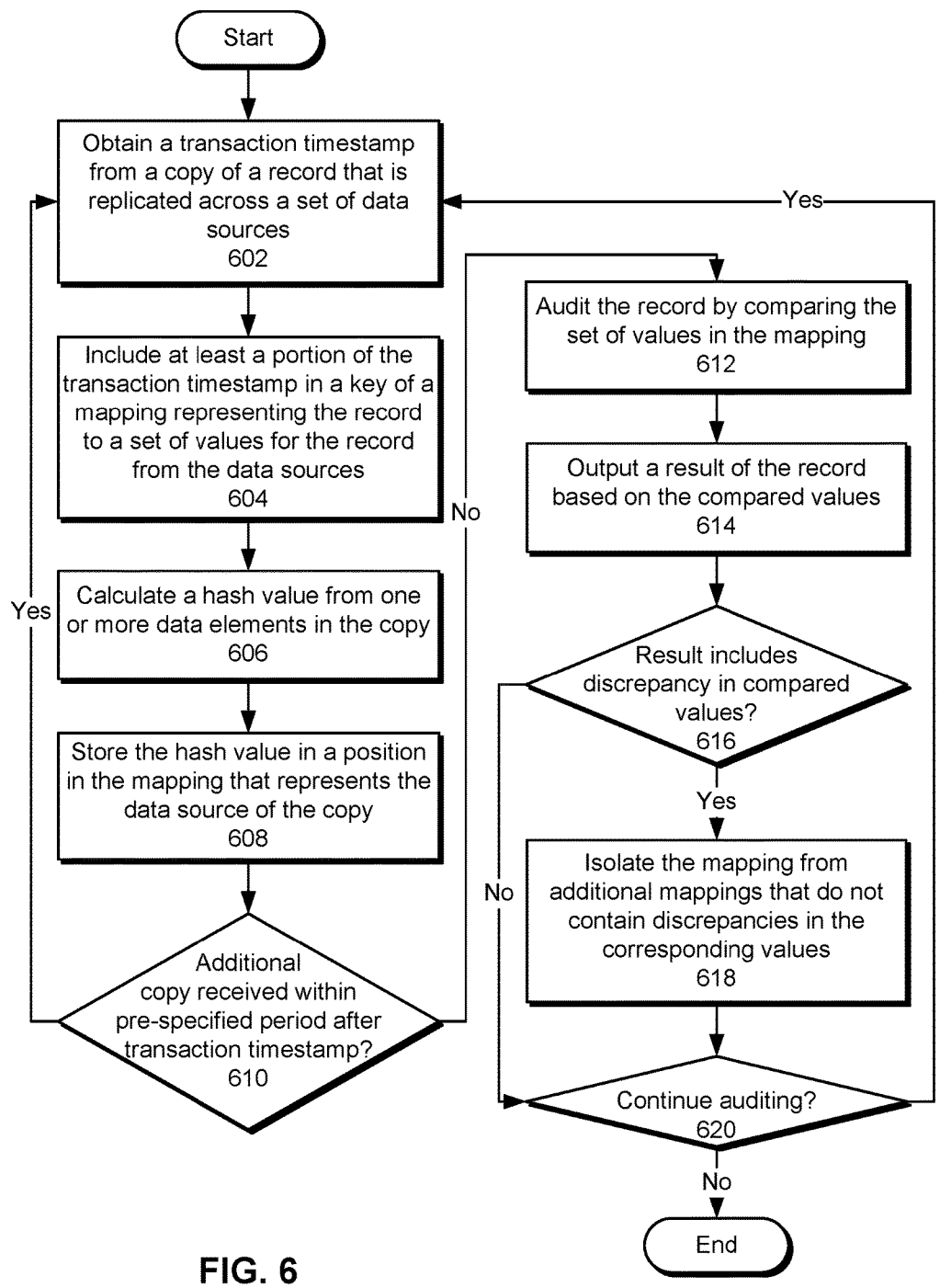
FIG. 6 shows a flowchart illustrating the process of tracking data replication in an incremental data audit in accordance with the disclosed embodiments.

FIG. 6 shows a flowchart illustrating the process of tracking data replication in an incremental data audit in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

First, a transaction timestamp is obtained from a copy of a record that is replicated across a set of data sources (operation 602). The transaction timestamp may represent the time at which a change to the record was originally generated or committed in a transaction at a given data source. The transaction timestamp and changed fields of the record may then be propagated to the other data sources so that the change is replicated in copies of the record at the other data sources.

Next, at least a portion of the transaction timestamp is included in a key of a mapping representing the record to a set of values for the record from the data sources (operation 604). For example, the day and hour portion of the transaction timestamp may be included in the key to deduplicate the record in the incremental data audit along an hourly boundary or "bucket." A hash value is then calculated from one or more data elements in the copy (operation 606) and stored in a position in the mapping that represents the data source of the copy (operation 608). For example, the hash value may be stored in a column, array element, and/or other "slot" in the mapping to which the data source is assigned and/or an identifier for the data source is mapped.

Operations 602-608 may be repeated for additional copies of the record that are received within a pre-specified period after the transaction timestamp (operation 610). For example, updates to the copies at the data sources may be received as the change is propagated across the data sources. Moreover, the pre-specified period may be set to the time limit for propagating changes across the data sources, as obtained from an SLA associated with the data sources. When a copy of the record with the same transaction timestamp is received from a data source, the transaction timestamp is used to generate the same key to the mapping (operations 602-604), and a hash value is calculated from data elements in the copy (operation 606) and stored in the corresponding position in the mapping (operation 608).

After the pre-specified period has passed, the record is audited by comparing the values in the mapping (operation 612), and a result of the audited record may be outputted based on the compared values (operation 614). For example, the result may be outputted as a notification of a discrepancy or lack of discrepancy in the values.

The mapping may further be processed based on the presence or absence of a discrepancy in the compared values from the result (operation 616). If the result includes the discrepancy, the mapping is isolated from additional mappings that do not contain discrepancies in the corresponding values (operation 618). For example, the mapping may be included in an index structure of data discrepancies in replicated records from the data sources and/or stored in a separate data store from a data store containing the additional mappings. If the result does not include the discrepancy, the mapping and/or other mappings that do not contain audit discrepancies may be discarded from the data store.

Auditing of the record and/or other records that are replicated across the data sources may continue (operation 620). If auditing of data in the records is to continue, transaction timestamps in the records are used to generate time-based mappings representing the records (operations 602-604), and hash values representing data elements in the replicated records are stored in the mappings (operations 606-608). The records are then audited after passage of a pre-specified time period after the times represented by the transaction timestamps (operations 610), and results of the audits are outputted and/or used to isolate discrepancies in the data (operations 612-618). Auditing of the replicated records may thus continue until the records are no longer replicated across the data sources.

Figure 7:
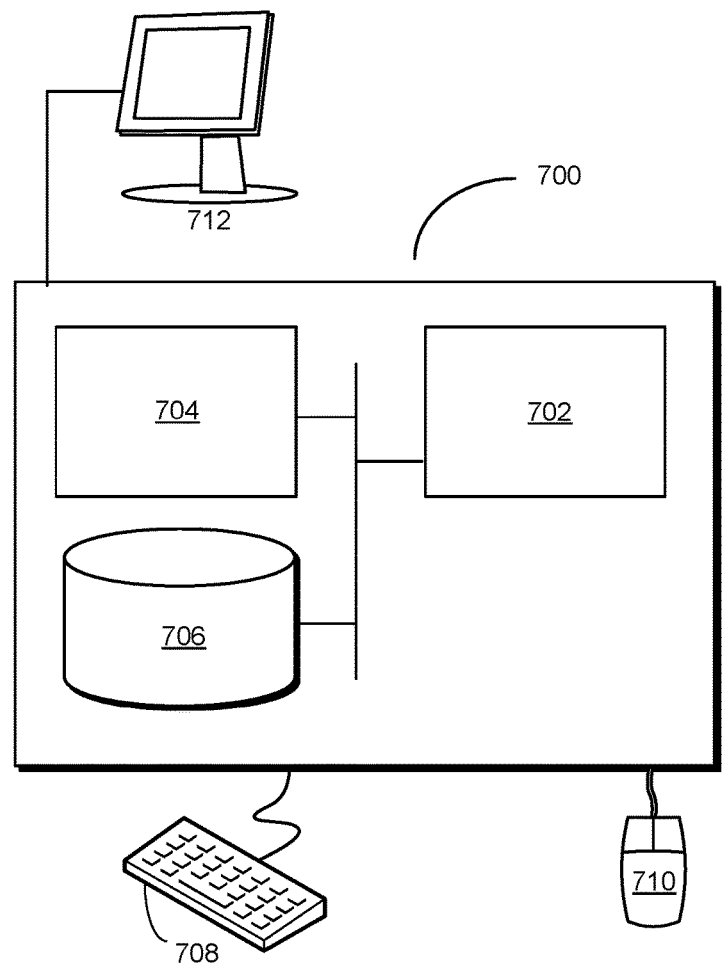
FIG. 7 shows a computer system in accordance with the disclosed embodiments.

FIG. 7 shows a computer system 700. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for processing data. The system may include an analysis apparatus that obtains input data containing a set of replicated records from a set of data sources. Next, the analysis apparatus may generate, in a data store, a first mapping of a first key to a first set of values for a first replicated record in the set of replicated records. The analysis apparatus may also generate, in the data store, a second mapping of a second key to a second set of values for a second replicated record in the set of replicated records.

The system may also include a management apparatus that audits the input data by comparing the first and second sets of values in parallel. The management apparatus may then output a result of the audited input data based on the compared sets of values. For example, the management apparatus may output a notification of a mismatch between two values in a given mapping, store the mapping in a separate data store, and/or index the mapping.

The analysis apparatus and management apparatus may also track the replication of changes to the records and discrepancies in the records. First, the analysis apparatus may obtain a first transaction timestamp from a record that is replicated across a set of data sources. Next, the analysis apparatus may include at least a portion of the first transaction timestamp in a first key of a first mapping representing the record to a first set of values for the record from the set of data sources. The management apparatus may then audit the record by comparing the first set of values in the first mapping and output a result of the audited record based on the compared first set of values. When the result includes a discrepancy in the first set of values, the management apparatus may isolate the first mapping from a set of additional mappings that do not contain discrepancies in the corresponding values.

The analysis apparatus may also obtain a second transaction timestamp from an update to the record and include at least a portion of the second transaction timestamp in a second key of a second mapping representing the record to a second set of values for the record from the set of data sources. The management apparatus may then re-audit the record by comparing the second set of values in the second mapping.

In addition, one or more components of computer system 700 may be remotely located and connected to the other components over a network. Portions of the present embodiments (e.g., analysis apparatus, management apparatus, data store, data sources, etc.) may also be located on different nodes of a distributed system that implements the embodiments. For example, the present embodiments may be implemented using a cloud computing system that performs real-time incremental data audits of a data set that is replicated across a number of remote data sources.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
obtaining a first transaction timestamp from a record that is replicated across a set of data sources;
including at least a portion of the first transaction timestamp in a first key of a first mapping of the record, wherein the first mapping of the record includes a first set of values, and wherein each value in the first set of values represents a copy of the record associated with a given data source in the set of data sources;
auditing the record when a pre-specified period has passed after a time represented by the first transaction timestamp, the record audited by comparing the first set of values in the first mapping, wherein auditing the record after the pre-specified period allows an update to the record to be propagated to the set of data sources within the pre-specified period; and
outputting a result of the audited record based on the compared first set of values.

2. The method of claim 1, further comprising:
when the result of the audited record comprises a discrepancy in the first set of values, isolating the first mapping from a set of additional mappings of additional records that do not contain discrepancies in the corresponding values.

3. The method of claim 2, wherein isolating the first mapping from the set of additional mappings comprises:
including the first mapping in an index structure representing data discrepancies in replicated records from the set of data sources.

4. The method of claim 2, wherein isolating the first mapping from the set of additional mappings comprises:
storing the first mapping in a separate data store from the set of additional mappings.

5. The method of claim 2, wherein isolating the first mapping from the set of additional mappings comprises:
discarding the set of additional mappings from a data store comprising the first mapping and the set of additional mappings.

6. The method of claim 1, further comprising:
obtaining a second transaction timestamp from an update to the record;
including at least a portion of the second transaction timestamp in a second key of a second mapping of the record to a second set of values for the record from the set of data sources; and
re-auditing the record by comparing the second set of values in the second mapping.

7. The method of claim 1, further comprising:
for each copy of the record from the set of data sources:
calculating a hash value from one or more data elements in the copy of the record; and
storing the hash value in a position in the first mapping that represents a data source of the copy.

8. The method of claim 1, wherein auditing the record by comparing the first set of values in the first mapping comprises:
when a pre-specified period has passed after a time represented by the first transaction timestamp, comparing the first set of values in the first mapping to detect a mismatch between two values in the first set of values.

9. The method of claim 1, wherein the first key further includes at least one of:
a schema;
a table; and
a primary key.

10. The method of claim 1, wherein the portion of the first transaction timestamp comprises a day and an hour.

11. An apparatus, comprising:
one or more processors; and
memory storing instructions that, when executed by the one or more processors, cause the apparatus to:
obtain a first transaction timestamp from a record that is replicated across a set of data sources;
include at least a portion of the first transaction timestamp in a first key of a first mapping of the record, wherein the first mapping of the record includes a first set of values, and wherein each value in the first set of values represents a copy of the record associated with a given data source in the set of data sources;
audit the record when a pre-specified period has passed after a time represented by the first transaction timestamp, the record audited by comparing the first set of values in the first mapping, wherein auditing the record after the pre-specified period allows an update to the record to be propagated to the set of data sources within the pre-specified period; and
output a result of the audited record based on the compared first set of values.

12. The apparatus of claim 11, wherein the memory further stores instructions that, when executed by the one or more processors, cause the apparatus to:
when the result of the audited record comprises a discrepancy in the first set of values, isolate the first mapping from a set of additional mappings of additional records that do not contain discrepancies in the corresponding values.

13. The apparatus of claim 12, wherein isolating the first mapping from the set of additional mappings comprises:
including the first mapping in an index structure representing data discrepancies in replicated records from the set of data sources.

14. The apparatus of claim 12, wherein isolating the first mapping from the set of additional mappings comprises:
storing the first mapping in a separate data store from the set of additional mappings.

15. The apparatus of claim 12, wherein isolating the first mapping from the set of additional mappings comprises:
discarding the set of additional mappings from a data store comprising the first mapping and the set of additional mappings.

16. The apparatus of claim 11, wherein the memory further stores instructions that, when executed by the one or more processors, cause the apparatus to:
obtain a second transaction timestamp from an update to the record;
include at least a portion of the second transaction timestamp in a second key of a second mapping of the record to a second set of values for the record from the set of data sources; and
re-audit the record by comparing the second set of values in the second mapping.

17. The apparatus of claim 11, wherein the memory further stores instructions that, when executed by the one or more processors, cause the apparatus to:
for each copy of the record from the set of data sources:
calculate a hash value from one or more data elements in the copy of the record; and
store the hash value in a position in the first mapping that represents a data source of the copy.

18. The apparatus of claim 11, wherein auditing the record by comparing the first set of values in the first mapping comprises:
when a pre-specified period has passed after a time represented by the first transaction timestamp, comparing the first set of values in the first mapping to detect a mismatch between two values in the first set of values.

19. A system, comprising:
an analysis module comprising a non-transitory computer-readable medium comprising instructions that, when executed, cause the system to:
obtain a first transaction timestamp from a record that is replicated across a set of data sources; and
include at least a portion of the first transaction timestamp in a first key of a first mapping of the record, wherein the first mapping of the record includes a first set of values, and wherein each value in the first set of values represents a copy of the record associated with a given data source in the set of data sources; and
a management module comprising a non-transitory computer-readable medium comprising instructions that, when executed, cause the system to:

audit the record when a pre-specified period has passed after a time represented by the first transaction timestamp, the record audited by comparing the first set of values in the first mapping, wherein auditing the record after the pre-specified period allows an update to the record to be propagated to the set of data sources within the pre-specified period; and output a result of the audited record based on the compared first set of values.

20. The system of claim 19, wherein the non-transitory computer-readable medium of the analysis module further comprises instructions that, when executed, cause the system to:

when the result of the audited record comprises a discrepancy in the first set of values, isolate the first mapping from a set of additional mappings of additional records that do not contain discrepancies in the corresponding values.

* * * * *